United States Patent
Moore et al.

(10) Patent No.: US 8,268,449 B2
(45) Date of Patent: Sep. 18, 2012

(54) THERMAL- AND CHEMICAL-RESISTANT ACID PROTECTION COATING MATERIAL AND SPIN-ON THERMOPLASTIC ADHESIVE

(75) Inventors: John C. Moore, Camarillo, CA (US); Michelle R. Fowler, Rolla, MO (US)

(73) Assignee: Brewer Science Inc., Rolla, MO (US)

( * ) Notice: Subject to any disclaimer, the term of this patent is extended or adjusted under 35 U.S.C. 154(b) by 1068 days.

(21) Appl. No.: 11/348,143

(22) Filed: Feb. 6, 2006

(65) Prior Publication Data

US 2007/0185310 A1    Aug. 9, 2007

(51) Int. Cl.
*C08L 23/16* (2006.01)

(52) U.S. Cl. ........ 428/451; 524/271; 524/274; 524/474; 524/570; 524/571; 524/599; 428/446

(58) Field of Classification Search .......... 524/271, 524/274, 474, 570, 571, 599; 428/446, 451
See application file for complete search history.

(56) References Cited

U.S. PATENT DOCUMENTS

| | | | |
|---|---|---|---|
| 2,279,256 A | | 4/1942 | Mark |
| 3,297,617 A | | 1/1967 | Regenstein |
| 3,868,433 A | | 2/1975 | Bartz et al. |
| 3,959,062 A | | 5/1976 | Hoh et al. |
| 3,970,494 A | | 7/1976 | Pritchard |
| 3,987,122 A | | 10/1976 | Bartz et al. |
| 4,508,877 A | | 4/1985 | Todoko et al. |
| 4,793,337 A | | 12/1988 | Freeman et al. |
| 4,918,133 A | | 4/1990 | Moriya et al. |
| 5,645,603 A | * | 7/1997 | Peters .................. 623/23.61 |
| 5,844,309 A | * | 12/1998 | Takigawa et al. ........... 257/701 |
| 5,888,650 A | | 3/1999 | Calhoun et al. |
| 6,054,363 A | | 4/2000 | Sakaguchi |
| 6,110,999 A | | 8/2000 | Ourth et al. |
| 6,235,818 B1 | | 5/2001 | Morizono et al. |
| 6,440,259 B1 | | 8/2002 | Patel |
| 6,548,579 B2 | | 4/2003 | Reski et al. |
| 6,828,020 B2 | | 12/2004 | Fisher et al. |
| 6,858,667 B1 | | 2/2005 | Flerlage et al. |
| 6,869,894 B2 | | 3/2005 | Moore |
| 6,916,681 B2 | | 7/2005 | Asano et al. |
| 6,933,342 B2 | | 8/2005 | Parg et al. |
| 7,084,201 B2 | | 8/2006 | Garfield et al. |
| 7,098,152 B2 | | 8/2006 | Moore |
| 2003/0168158 A1 | | 9/2003 | Kato |
| 2004/0185187 A1 | | 9/2004 | Yokoyama et al. |
| 2004/0260021 A1 | | 12/2004 | Macedo et al. |
| 2004/0266947 A1 | | 12/2004 | Macedo et al. |
| 2005/0164509 A1 | | 7/2005 | Koshimizu et al. |
| 2005/0173064 A1 | | 8/2005 | Miyanari |
| 2005/0181579 A1 | | 8/2005 | Thallner |
| 2006/0183269 A1 | | 8/2006 | Fuergut et al. |

FOREIGN PATENT DOCUMENTS

| | | |
|---|---|---|
| EP | 1 700 896 | 9/2006 |
| JP | 1-163241 | 6/1989 |
| JP | 5-271485 | 10/1993 |
| JP | 06-271806 | * 9/1994 |
| JP | H6-271806 | 9/1994 |
| JP | 9-176398 | 7/1997 |
| JP | 2001-139755 | 5/2001 |
| JP | 2004-156048 | 6/2004 |
| WO | WO 03/106169 | * 12/2003 |
| WO | WO 2006/093639 | 9/2006 |
| WO | WO 2008/068897 | 6/2008 |

OTHER PUBLICATIONS d-limonene. A data sheet from the Compendium of Pesticide Common Names, 1 page.
Safety (MSDS) data for Triton X-100, 1 page.
ExxonMobil Chemical Vistalon, Vistalon 2504 Specifications, 2005, 1 page.
F. Niklaus et al., "Adhesive Wafer Bonding," J. Appl. Phys., 2006, 99, 031101.
J. Moore et al., "High Temperature Resistant Adhesive for Wafer Thinning and Backside Processing," MANTECH 2004, 8.10, 4 pages.
C. Brubaker et al., "Advances in Processing of Compound Semiconductor Substrates," MANTECH 2005, 4 pages.
Y. Kwon et al., "An Evaluation Process of Polymeric Adhesive Wafer Bonding for Vertical System Integration," Japanese Journal of Applied Physics, vol. 44, No. 6A, 2005, pp. 3893-3902.
Technical DataSheet Abstract Ebecryl 168, UCB Chemicals, Additive, Adhesion promoter/Bonding agent, 2006 SpecialChem S.A., 1 page http://www.specialchem4coatings.com/common/pc/product/displayproduct.aspx?id=12887&srchid=220571.
MatWeb, The Online Materials Database: Zeon Chemicals Zeonex 480R Cyclo Olefin Optical Grade Polymer; Subcategory: Cyclo Olefin Polymer, Polymer, Thermoplastic, 2006, 1 page http://www.matweb.com/search/SpecificMaterialPrint.asp?bassnum=PZEON6.
Material Safety Data Sheet, ExxonMobil Chemical Company, Vistalon Ethylene Propylene Rubber, Apr. 14, 2005, 1 page.
IDES, The Plastics Web, Zeonex 480R, 1 page, 2006, http://www.ides.com/grades/ds/E40300.htm.

(Continued)

*Primary Examiner* — Jennifer Chriss
*Assistant Examiner* — Gregory Clark
(74) *Attorney, Agent, or Firm* — Hovey Williams LLP

(57) ABSTRACT

New compositions for use as protective coatings and/or adhesives are provided. The compositions comprise a hydrocarbon resin (e.g., terpene rosin) and a rubber (e.g., EPDM) dispersed or dissolved in a solvent system. The solvent system is preferably a single-solvent system, and the compositions are preferably free of surfactants, dyes, and chromophores. The compositions can be cured or dried to form layers or films that are chemically and thermally resistant, but that can be readily dissolved and removed at the appropriate stage in the fabrication process.

15 Claims, No Drawings

OTHER PUBLICATIONS

Eastman Product Data Sheet, Eastotack H-142W Resin, Sep. 13, 2006, 2 pages, http://www.eastman.com/ProductCatalogApps/PageControllers/ProdDatasheet_PC.aspx?p....

Eastman H-142 Resin, Application Uses and Key Attributes, Sep. 13, 2006, 1 page http://www.eastman.com/products/producthome.asp-?product=71016204&SelectorUrl=%2....

Frank Niklaus, Adhesive Wafer Bonding Technology, Department of Signals, Sensors and Systems, Royal Institute of Technology (KTH), Stockholm, Sweden, Copyright 2002, 33 pages.

Grunsven et al., "Wafer Level Chip Size Packaging Technology for Power Devices Using Low Ohmic Through-Hole Vias," 14th European Microelectronics and Packaging Conference and Exhibition, Germany, Jun. 23-25, 2003, pp. 46-50.

Fukushima et al., "New Three-Dimensional Integration Technology Using Chip-to-Wafer Bonding to Archive Ultimate Super-Chip Integration," The Japan Society of Applied Physics, vol. 43, Mo. 4B, 2006, 3030-3035.

Library 4 Science, Pinene, 2006, 1 page, http://www.chromatography-online org/topics/pinene.html.

Technical DataSheet Abstract Vanax 808 HP, R.T. Vanderbilt, Additive, Crosslinking Catalyst/Accelerator/Initiator >>Amine or Nitrogen Content, 2006 SpecialChem S.A., 2006, 1 page http://www.specialchem4polymers.com/common/pa/product/displayproductaspx?id=7815&srchid=292522.

Ciba Specialty Chemicals, Additives, Polymer Additives, Ciba IRGANOX 1010, Phenolic Primary Antioxidant for Processing and Long-Term Thermal Stabilization, Oct. 1999, 2 pages.

Ciba Specialty Chemicals, Additives, Polymer Additives, Ciba IRGAFOS 168, Hydrolytically Stable Phosphite Processing Stabilizer, Sep. 1999, 2 pages.

Chemical Land 21, Organic Chemicals, Mesitylene, 1 page.

www.sigma-aldrich.com, 457531 Poly-a-pinene, Sep. 13, 2006, http://www.sigmaaldrich.com/catalog/search/ProductDetail/ALDRICH/457531?PrtPrv=1....

Buns EP T 6250, Lanxess, Lanxess Deutschland GmbH, Business Unit Technical Rubber Products, Product Data Sheet.

Eastman, Eastotac, http://www eastman.com/brands/eastotac/producthome.asp?product=71016204.

Eastman, Product Data Sheet, Eastotac Resin H-142W, http://eastman.com/productcatalogapps/pagecontrollers/proddatasheet_PC.aspx?.

Office action in U.S. Appl. No. 12/195,224 dated Mar. 30, 2009.

Machine translation of Japan 2004-156048, 10 pages.

Machine translation of Japan 9-176398, 16 pages.

Machine translation of Japan 5-271485, 16 pages.

Machine translation of Japan 2001-139755, 7 pages.

\* cited by examiner

THERMAL- AND CHEMICAL-RESISTANT ACID PROTECTION COATING MATERIAL AND SPIN-ON THERMOPLASTIC ADHESIVE

BACKGROUND OF THE INVENTION

1. Field of the Invention

The present invention is broadly concerned with novel compositions that can be used to form protective coatings and carrier wafer adhesives.

2. Description of the Prior Art

Wafer (substrate) thinning has been used to dissipate heat and aid in the electrical operation of the integrated circuits (IC). Thick substrates cause an increase in capacitance, requiring thicker transmission lines, and, in turn, a larger IC footprint. Substrate thinning increases impedance while capacitance decreases impedance, causing a reduction in transmission line thickness, and, in turn, a reduction in IC size. Thus, substrate thinning facilitates IC miniaturization.

Geometrical limitations are an additional incentive for substrate thinning. Via holes are etched on the backside of a substrate to facilitate frontside contacts. In order to construct a via using common dry-etch techniques, geometric restrictions apply. For substrate thicknesses of less than 100 µm, a via having a diameter of 30-70 µm is constructed using dry-etch methods that produce minimal post-etch residue within an acceptable time. For thick substrates, vias with larger diameters are needed. This requires longer dry-etch times and produces larger quantities of post-etch residue, thus significantly reducing throughput. Larger vias also require larger quantities of metallization, which is more costly. Therefore, for backside processing, thin substrates can be processed more quickly and at lower cost.

Thin substrates are also more easily cut and scribed into ICs. Thinner substrates have a smaller amount of material to penetrate and cut and therefore require less effort. No matter what method (sawing, scribe and break, or laser ablation) is used, ICs are easier to cut from thinner substrates. Most semiconductor wafers are thinned after frontside operations. For ease of handling, wafers are processed (i.e., frontside devices) at their normal full-size thicknesses, e.g., 600-700 µm. Once completed, they are thinned to thicknesses of 100-150 µm. In some cases (e.g., when hybrid substrates such as gallium arsenide (GaAs) are used for high-power devices) thicknesses may be taken down to 25 µm.

Mechanical substrate thinning is performed by bringing the wafer surface into contact with a hard and flat rotating horizontal platter that contains a liquid slurry. The slurry may contain abrasive media along with chemical etchants such as ammonia, fluoride, or combinations thereof. The abrasive provides "gross" substrate removal, i.e., thinning, while the etchant chemistry facilitates "polishing" at the submicron level. The wafer is maintained in contact with the media until an amount of substrate has been removed to achieve a targeted thickness.

For a wafer thickness of 300 µm or greater, the wafer is held in place with tooling that utilizes a vacuum chuck or some means of mechanical attachment. When wafer thickness is reduced to less than 300 µm, it becomes difficult or impossible to maintain control with regard to attachment and handling of the wafer during further thinning and processing. In some cases, mechanical devices may be made to attach and hold onto thinned wafers, however, they are subject to many problems, especially when processes may vary. For this reason, the wafers are mounted onto a separate rigid (carrier) substrate. This substrate becomes the holding platform for further thinning and post-thinning processing. Carrier substrates are composed of materials such as sapphire, quartz, certain glasses, and silicon, and usually exhibit a thickness of 1000 µm. Substrate choice will depend on how closely matched the coefficient of thermal expansion (CLTE) is between each material.

SUMMARY OF THE INVENTION

The present invention overcomes these problems by broadly providing novel compositions for use as adhesive or protective coatings.

In more detail, the inventive compositions comprise a hydrocarbon resin and a rubber dispersed or dissolved in a solvent system. As used herein, "rubber" is intended to include all natural and synthetic rubbers as well as elastomers.

The hydrocarbon resin is preferably present in the composition at levels of from about 10-40% by weight, more preferably from about 25-35% by weight, and even more preferably from about 29-33% by weight, based upon the total weight of the composition taken as 100% by weight. On a solids basis, the hydrocarbon resin is preferably present at levels of from about 65-95% by weight, more preferably from about 75-95% by weight, and even more preferably from about 80-90% by weight.

The hydrocarbon resin preferably has an average $M_w$ of from about 300-10,000 Daltons, more preferably from about 500-5,000 Daltons, and even more preferably from about 800-2,000 Daltons. $M_w/M_n$ is preferably from about 1.5-2.5, more preferably from about 1.7-2.3, and even more preferably from about 1.8-2.1. Preferred hydrocarbon resins preferably have a softening point (ring and ball softening point) of at least about 100° C., more preferably from about 115-150° C., and even more preferably from about 130-145° C. Furthermore, it is preferred that the hydrocarbon resin have a Brookfield viscosity at 190° C. of from about 2,500-3,500 cP, preferably from about 2,800-3,200 cP, and even more preferably about 2,900-3,100 cP.

Suitable hydrocarbon resins include rosins such as those selected from the group consisting of terpene rosins, gum rosins, wood rosins, and mixtures thereof. Preferred hydrocarbon resins are sold under the name Eastotac, available from Eastman Chemical Company.

The rubber is preferably present in the composition at levels of from about 1-7% by weight, more preferably from about 3-7% by weight, and even more preferably from about 5-6% by weight, based upon the total weight of the composition taken as 100% by weight. On a solids basis, the rubber is preferably present at levels of from about 4-20% by weight, more preferably from about 10-18% by weight, and even more preferably from about 14-16% by weight.

Preferred rubbers will have a Mooney Viscosity (ML (1+4) 125° C.; as determined by ISO289/ASTM D 1646) of from about 40-70 MU, preferably from about 45-65 MU, and even more preferably from about 50-60 MU. The rubber preferably has an $M_w$ of from about 250,000-600,000 Daltons, and more preferably from about 400,000-500,000 Daltons, and an $M_n$ of from about 50,000-350,000 Daltons, and more preferably from about 100,000-200,000 Daltons. $M_w/M_n$ is preferably from about 1-4, more preferably from about 1.3-3, and even more preferably from about 2-2.5.

The most preferred rubbers include recurring monomers of ethylene and propylene. The quantity of ethylene monomers in the rubber is preferably from about 40-70% by weight, more preferably from about 40-60% by weight, and even more preferably about 40-50% by weight, based upon the total weight of the rubber taken as 100% by weight. The quantity of propylene monomers in the rubber is preferably from about 35-65% by weight, more preferably from about 35-55% by weight, and even more preferably about 35-45% by weight, based upon the total weight of the rubber taken as 100% by weight.

Even more preferably, the rubber further comprises small amounts of nonconjugated diene (e.g., ethylidene norbornene monomers). The quantity of nonconjugated diene in the rubber is preferably from about 1-10% by weight, more preferably from about 2-6% by weight, and even more preferably from about 2-3% by weight, based upon the total weight of the rubber taken as 100% by weight.

The most preferred rubber is an ethylene-propylene terpolymer, also referred to as ethylene-propylene-diene monomers or EPDM. Preferred ethylene-propylene terpolymers are sold under the name BUNA® EP by Lanxess.

The composition should comprise from about 40-95% by weight solvent system, preferably from about 50-90% by weight solvent system, and even more preferably from about 60-70% by weight solvent system, based upon the total weight of the composition taken as 100% by weight. Preferably, the majority of the solvent system comprises a single solvent. More particularly, it is preferred that a single solvent make up at least about 94% by weight, preferably at least about 96% by weight, and even more preferably at least about 99.5% by weight of the solvent system, based upon the total weight of the solvent system taken as 100% by weight. Furthermore, the solvent system should have a flash point of less than about 100° C., and preferably from about 45-100° C.

Preferred solvent systems include both aromatic and aliphatic hydrocarbons. Preferred aliphatics include those that are from about $C_1$-$C_{20}$, more preferably from about $C_2$-$C_{14}$, and even more preferably from about $C_6$-$C_{12}$. Even more preferably, the aliphatics are olefinic, and even more preferably α-olefinic. One such solvent is 1-dodecene.

Preferred aromatics are from about $C_6$-$C_{16}$, more preferably from about $C_8$-$C_{12}$, and even more preferably from about $C_8$-$C_{10}$. The most preferred aromatics include those selected from the group consisting of trimethylbenzene, xylene, cumene, toluene, ethyl benzene, chlorobenzene, dichlorobenzene, fluorinated aromatics, pinene, d-limonene, mesitylene, and mixtures thereof. Preferred aromatics are sold under the name Aromatic 100 or Aromatic 150 by Exxon Mobil Chemical Co.

In one preferred embodiment, the inventive composition is essentially free (and preferably completely free) of surfactants. In this embodiment, the composition comprises less than about 0.5% by weight, preferably less than about 0.1% by weight, and even more preferably about 0% by weight surfactant, based upon the total weight of the composition taken as 100% by weight.

In another preferred embodiment, the inventive composition is essentially free (and preferably completely free) of dyes and chromophores. In this embodiment, the composition comprises less than about 0.5% by weight, preferably less than about 0.1% by weight, and even more preferably about 0% by weight dyes and chromophores, based upon the total weight of the composition taken as 100% by weight.

In a particularly preferred embodiment, the inventive compositions consist essentially of the hydrocarbon resin and rubber dispersed or dissolved in a solvent system. In this embodiment, the hydrocarbon resin, rubber, and solvent system can be the types and quantities described previously.

In other embodiments, the composition could include a number of optional ingredients, including surfactants, dyes, and chromophores.

The inventive compositions are formed by simply mixing the hydrocarbon resin, rubber, and other ingredients with the solvent system, preferably while heating to temperatures of from about 90-100° C. for time periods of from about 45-100 hours, preferably while maintaining a substantially constant temperature. After this time, the heat source is removed, and the solution is allowed to cool, with stirring preferably being carried out for an additional 15-25 hours. The mixture can optionally be filtered (preferably to an average particle size of from about 4.0-6.0 μm), resulting in the final composition. The final composition should have a Brookfield viscosity at 37.8° C. of from about 900-1,800 cP, preferably from about 1,000-1,500 cP, and even more preferably about 1,100-1,200 cP. Thus, the compositions will be flowable at room temperature.

When used as a protective coating such as a coating to protect against acids, the composition is simply applied to a substrate, including microelectronic substrates such as those selected from the group consisting of silicon, aluminum, tungsten, tungsten silicide, gallium arsenide, germanium, tantalum, tantalum nitrite, SiGe, low k dielectric layers, dielectric layers (e.g., silicon oxide, silicon nitride), and ion implant layers. A preferred application method involves spin-coating the composition at spin speeds of from about 500-3,000 rpm (more preferably from about 1,300-1,800 rpm), at accelerations of from about 4,500-5,000 rpm/second, and for spin times of from about 15-45 seconds.

After coating, the substrate can be baked (e.g., on a hot plate) at temperatures of from about 60-120° C., preferably from about 80-110° C., and even more preferably from about 90-100° C., for a time period of from about 60-240 seconds, and more preferably from about 100-200 seconds. The coated substrate can optionally be subjected to a second bake at temperatures of from about 120-250° C. The film thickness after bake will typically be from about 0.1-40 μm, preferably from about 5-30 μm, more preferably from about 10-20 μm, and even more preferably from about 14-16 μm.

When used as an adhesive, the composition can be applied to the same types of substrates (the frontside surface or device area), using the conditions described with respect to the protective coatings. However, it will be appreciated that the application steps can be varied to achieve a particular thickness. The composition is then baked as described above, thus causing the solvent to evaporate and produce a smooth, uniform coating. A second layer can be applied and baked, if desired.

After baking, the desired carrier wafer (e.g., sapphire carrier wafer, ceramic, glass, quartz, silicon) is contacted with, and pressed against, the layer of inventive composition. The carrier wafer is bonded to this inventive adhesive layer by heating at a temperature of from about 80-250° C., preferably from about 120-180° C., and more preferably from about 150-160° C. This heating is preferably carried out under a vacuum of from about 0.1-40 inches of mercury, more preferably from about 18-30 inches of mercury, and even more preferably from about 20-25 inches of mercury, and for a time period of from about 1-5 minutes, and more preferably from about 2-3 minutes.

The wafer package can then be subjected to subsequent thinning of the substrate. It will be appreciated that the substrates can be thinned to thicknesses of less than about 100 μm, preferably less than about 50 μm, and more preferably less than about 25 μm. After thinning, typical backside processing, including photolithography, via etching, and metallization, may be performed.

Advantageously, the cured or dried films or layers of the inventive compositions possess a number of highly desirable properties. For example, the films will exhibit low outgassing for vacuum etch processes. That is, if a 15-μm thick film of the composition is baked at 100° C. for 2 minutes, the solvents will be driven from the composition so that subsequent baking at 200° C. for 30 minutes results in a film thickness change of less than about 5%, preferably less than about 2%, and even more preferably less than about 1% or even 0% (referred to as the "Film Shrinkage Test").

The cured or dried films can be heated to temperatures of 130° C. without reactions occurring in the film. The films can also be exposed to hydrophilic lithographic chemistries (e.g., N-methylpyrrolidone) at a temperature of 100° C. for 60 minutes without reacting.

The cured or dried composition is also acid- and base-resistant. That is, a cured or dried layer of the composition having a thickness of 15 μm can be submerged in an acid (e.g., 49% hydrofluoric acid) or base (e.g., 30% ammonium hydroxide, 20-40% potassium hydroxide) for at least 45 minutes without the acid or base removing, etching, or otherwise damaging the layer.

While the cured or dried composition is chemically and thermally resistant as discussed above, it also can be easily dissolved and removed with certain solvents, thus making it ideal for use as a carrier wafer adhesive. The cured or dried composition can be removed using the original solvent that was part of the composition prior to curing or drying as well as using non-polar solvents such as xylene, benzene, limonene, and any other solvent described above as acceptable for use as part of the inventive compositions. The layer will begin to soften within a few minutes of being placed in the dissolving solvent, and will be completely dissolved (at least about 98%, preferably at least about 99%, and more preferably about 100%) after two hours of immersion in a dissolving solvent having a temperature of 130° C.

DETAILED DESCRIPTION OF THE PREFERRED EMBODIMENTS

Examples

The following examples set forth preferred methods in accordance with the invention. It is to be understood, however, that these examples are provided by way of illustration and nothing therein should be taken as a limitation upon the overall scope of the invention.

Example 1

Preparation of a Protective Coating

In this procedure, 3,250.00 grams of 1-dodecene (Aldrich Chemical Co., Milwaukee, Wis.) were added to a 12-liter, round glass reactor. Next, 262.56 grams of Buna® EP T6250 (LANXESS Corp., Akron, Ohio) and 1,487.50 grams of Eastotac H142w (Eastman Chemical Co., Kingsport, Tenn.) were added to the reactor. The reagents were stirred continuously in the reactor while the contents were heated to 10° C. The contents were continuously stirred and maintained at a constant temperature of 100° C. for 95 hours and 35 minutes, until a homogeneous mixture was achieved. While stirring continued, the heat was turned off, and the mixture was allowed to cool to room temperature. A dilution curve was prepared to determine the % solids level necessary to achieve a 15-μm thick film. The composition was further diluted and stirred until a film of this thickness was achieved. The batch was then filtered to 5.0 μm using a Meisner cartridge filter. The viscosity of the material after filtration was 1,100 cP.

The material was spin applied to a silicon nitride substrate using a static dispense at a spin speed of 1,500 rpm. Acceleration was 5,000 rpm/second, and spin time was 30 seconds. The coated substrate was then baked on a hot plate at 100° C. for 2 minutes using no vacuum. The resulting coating thickness was 15 μm.

Next, 200 ml of 48% hydrofluoric acid were added to a small tub. The coated and baked substrate was immersed in the acid. The coating protected the substrate from the acid for 45 minutes at room temperature.

Example 2

Preparation of a Spin-on Adhesive

In this procedure, 3,250.20 grams of d-limonene were added to a 12-liter round glass reactor. Next, 262.46 grams of Buna® EP T6250 (LANXESS Corp., Akron, Ohio) and 1,487.50 grams of Eastotac H142w (Eastman Chemical Co., Kingsport, Tenn.) were added to the reactor. The reagents were stirred continuously in the reactor while the contents were heated to 100° C. The contents were continuously stirred and maintained at a constant temperature of 100° C. for 51 hours and 45 minutes. While stirring continued, the heat was turned off, and the contents were allowed to reach room temperature. A dilution curve was prepared to determine the % solids level necessary to achieve a 15-μm thick film. The composition was further diluted and stirred until a film of this thickness was achieved. Two liters of the batch were filtered to 5.0 μm using a Meisner cartridge filter. The remainder of the batch was stored unfiltered in glass bottles.

The filtered material was spin applied to a silicon substrate wafer using a static dispense at a spin speed of 1,500 rpm. Acceleration was 5,000 rpm/second, and spin time was 30 seconds. The coated wafer was baked on a hot plate at 100° C. for 2 minutes using no vacuum. The wafer was then placed, coated side up, in a Dynatex bonder. A sapphire perforated carrier wafer was placed on top of, and in contact with, the coated wafer. The sapphire wafer was bonded to the silicon wafer at 155° C. under a vacuum of 22 inches of mercury for 2 minutes. The wafer package was removed from the bonder for subsequent thinning of the silicon portion.

We claim:

1. The combination of:
    a substrate having a surface, wherein said substrate is a microelectronic substrate selected from the group consisting of silicon, tungsten, tungsten silicide, gallium arsenide, germanium, tantalum, tantalum nitrite, SiGe, low k dielectric layers, dielectric layers, and ion implant layers; and
    a layer of a composition adjacent said substrate surface, said composition comprising from about 65-95% by weight on a solids basis of a hydrocarbon resin and from about 4-20% by weight on a solids basis of a rubber dispersed or dissolved in a solvent system, wherein said rubber comprises recurring monomers of ethylene and propylene, and said solvent system comprises at least about 95% by weight of a single solvent, said single solvent percentage by weight being based upon the total weight of the solvent system taken as 100% by weight.

2. The combination of claim 1, wherein said layer, when cured or dried, exhibits less than about 5% film thickness change when subjected to a film shrinkage test.

3. The combination of claim 1, wherein said layer, when cured or dried, is acid-resistant.

4. The combination of claim 1, wherein said layer, when cured or dried, is at least about 98% dissolved after two hours of submersion in a non-polar solvent having a temperature of 130° C.

5. The combination of:
- a substrate having a surface, wherein said substrate is a microelectronic substrate selected from the group consisting of silicon, tungsten, tungsten silicide, gallium arsenide, germanium, tantalum, tantalum nitrite, SiGe, low k dielectric layers, dielectric layers, and ion implant layers; and
- a layer of a composition adjacent said substrate surface, said composition comprising from about 65-95% by weight on a solids basis of a hydrocarbon resin and from about 4-20% by weight on a solids basis of a rubber dispersed or dissolved in a solvent system, said rubber comprising recurring monomers of ethylene and propylene, and said composition being free of surfactant.

6. The combination of claim 5, wherein said layer, when cured or dried, exhibits less than about 5% film thickness change when subjected to a film shrinkage test.

7. The combination of claim 5, wherein said layer, when cured or dried, is acid-resistant.

8. The combination of claim 5, wherein said layer, when cured or dried, is at least about 98% dissolved after two hours of submersion in a non-polar solvent having a temperature of 130° C.

9. The combination of:
- a substrate having a surface, wherein said substrate is a microelectronic substrate selected from the group consisting of silicon, tungsten, tungsten silicide, gallium arsenide, germanium, tantalum, tantalum nitrite, SiGe, low k dielectric layers, dielectric layers, and ion implant layers; and
- a layer of a composition adjacent said substrate surface, said composition comprising from about 65-95% by weight on a solids basis of a hydrocarbon resin and from about 4-20% by weight on a solids basis of a rubber dispersed or dissolved in a solvent system, said rubber comprising recurring monomers of ethylene and propylene, and said composition being free of dyes and chromophores.

10. The combination of claim 9, wherein said layer, when cured or dried, exhibits less than about 5% film thickness change when subjected to a film shrinkage test.

11. The combination of claim 9, wherein said layer, when cured or dried, is acid-resistant.

12. The combination of claim 9, wherein said layer, when cured or dried, is at least about 98% dissolved after two hours of submersion in a non-polar solvent having a temperature of 130° C.

13. The combination of claim 1, wherein said composition consists essentially of said hydrocarbon resin and said rubber dispersed or dissolved in a solvent system.

14. The combination of claim 5, wherein said composition consists essentially of said hydrocarbon resin and said rubber dispersed or dissolved in a solvent system.

15. The combination of claim 9, wherein said composition consists essentially of said hydrocarbon resin and said rubber dispersed or dissolved in a solvent system.

* * * * *